United States Patent [19]
Ritter

[11] Patent Number: 4,979,832
[45] Date of Patent: Dec. 25, 1990

[54] DYNAMIC SUBSTITUTION COMBINER AND EXTRACTOR

[76] Inventor: Terry F. Ritter, 2609 Choctaw Trail, Austin, Tex. 78745

[21] Appl. No.: 431,016

[22] Filed: Nov. 1, 1989

[51] Int. Cl.$^5$ ............................................. H04L 9/00
[52] U.S. Cl. ....................................... 380/28; 380/46; 380/49
[58] Field of Search ....................... 380/42, 28, 56, 57, 380/58, 46, 49

[56] References Cited

U.S. PATENT DOCUMENTS

| | | | |
|---|---|---|---|
| Re. 30,957 | 6/1982 | Feistel | 380/42 |
| 1,310,719 | 7/1919 | Vernam | |
| 2,496,317 | 2/1950 | Smith | |
| 2,567,214 | 9/1951 | Kohler | |
| 3,159,712 | 12/1964 | Arko | |
| 4,202,051 | 5/1980 | Davida | 375/2 |
| 4,751,733 | 6/1988 | Delayaye et al. | 380/42 |
| 4,797,922 | 1/1989 | Massey | 380/46 |

OTHER PUBLICATIONS

Knuth, *The Art of Computer Programming*, vol. II, pp. 31–32, (The MacLaren–Marsaglia Raudomizer).

Michener, "The Generalized Rotor ...", *Cryptologia*, Apr. 1985, pp. 97–102.

Rubin, "Foiling an Exhaustive Key-Search Attack", *Cryptologia*, Apr. 1987, pp. 102–104.

Algorithm 235, Random Permutation, Procedure Shuffle, R. Durstenfeld, *Communications of the ACM*, vol. 7, No. 7, Jul. 1964, p. 420.

*Primary Examiner*—Thomas H. Tarcza
*Assistant Examiner*—David Cain

[57] ABSTRACT

A first data source and a second data source are combined into a complex intermediate form or result; the first data source can be extracted from the intermediate form using the second data source. The combining mechanism can provide an alternative to the exclusive-OR combiner commonly used in stream ciphers.

Each data value from the first data source is transformed by substitution using one of potentially multiple translation tables (12). The translations within each table can be changed after each substitution operation using a changes controller (18). Commonly, the just-used table is re-arranged or permuted; permutation retains invertibility, so that the ciphertext may be deciphered. As a particular design, the just-used substitution element may be exchanged with some element within the same table, as selected by the second data source, after every translation.

The combiner substitution tables (12) can easily be forced to be invertible, and when they are, extraction is possible by substitution through inverse tables (24). Valid inverse tables can be maintained provided that the same second data is used by both mechanisms. This is the normal situation in stream ciphers.

The combiner can also be used to combine two pseudo-random confusion streams into a more-complex confusion stream. In this case, exctraction may be unnecessary and so the combiner substitution tables need not be invertible. Thus, the translation changes need not be limited to permutations.

19 Claims, 1 Drawing Sheet

DYNAMIC SUBSTITUTION COMBINER AND EXTRACTOR

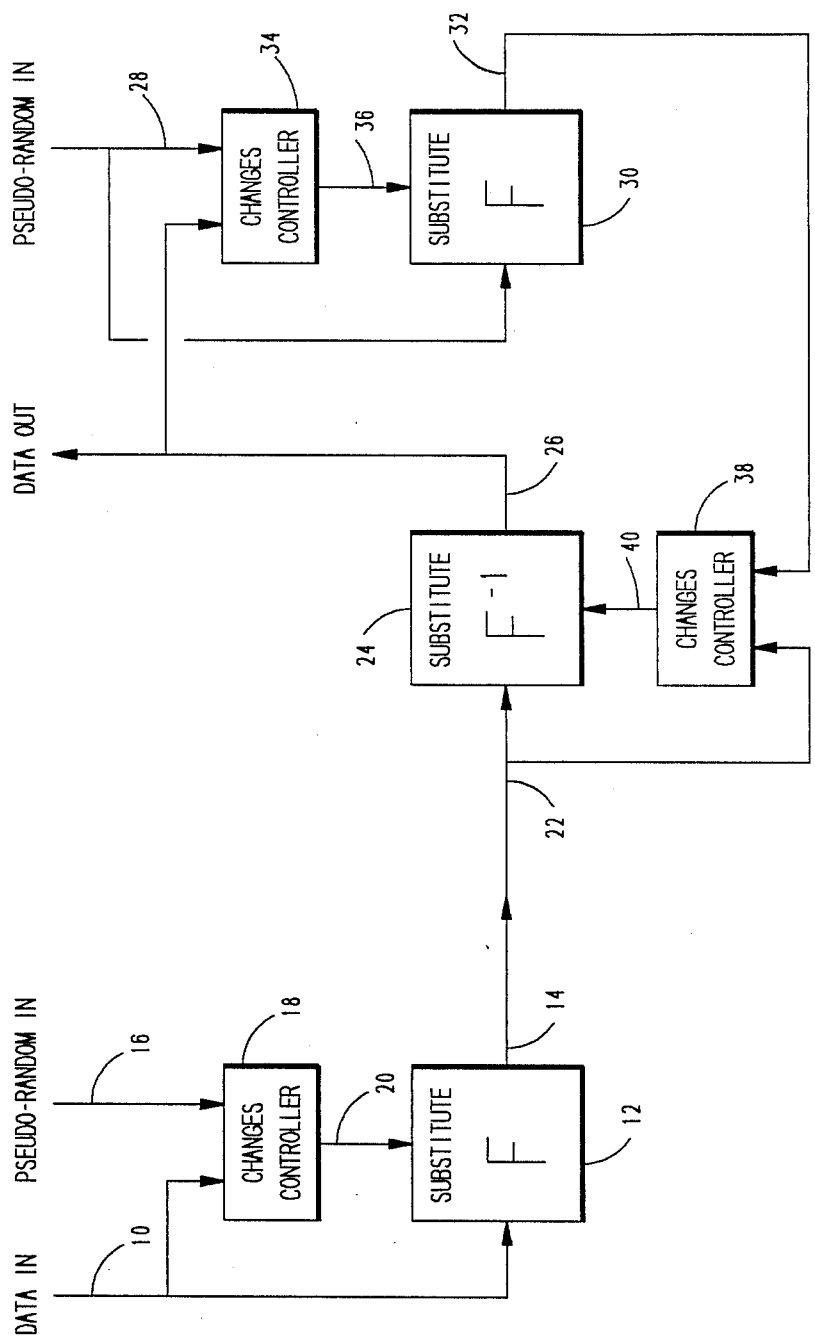
FIG. 1--DYNAMIC SUBSTITUTION COMBINER AND EXTRACTOR

DYNAMIC SUBSTITUTION COMBINER AND EXTRACTOR

TECHNICAL FIELD

This invention relates to the art of cryptography, or the secure transmission of information. More particularly, this invention relates to mechanisms or processes for combination two data sources into a result, and to inverse mechanisms or processes for extracting data from a combined result.

BACKGROUND—CLASSICAL PRIOR ART

For the purpose of this patient, the term mechanism will refer to the logical concept of a machine, which may be realized either as a physical machine, or as a sequence of logical commands executed by a physical machine.

The object of cryptography is to transform information or plaintext into an intermediate form of ciphertext which conceals the information, but which may be used to reproduce the information at a different place or later time. The main problem of cryptography is the construction of intermediate information forms which can be efficiently created and then used, given a special understand or key, but which are extremely difficult to use without that special understanding.

This invention may be used to translate plaintext data into ciphertext using a key, and to recover the original plaintext data using the same key. A particular key value would typically select the generation of a particular random-like or pseudo-random sequence of confusion data; the design of such a generator is well understood and not part of this invention. The confusion data would be combined with the plaintext data in order to encipher or hide the plaintext. The same confusion data would be inversely combined with the ciphertext data in order to decipher or recover the original plaintext. Various other applications are also possible.

One of the ancient forms of cipher is known as substitution. In a monoalphabetic substitution cipher, each plaintext letter has one fixed ciphertext substitute. In this case, the key is the set of substitutions, or substitution alphabet which is used. One way to implement substitution is through the use of a translation table. Conceptually, a translation table is just a list of the output or substitute values, listed in the order of the input or to-be-substituted values. Substitution consists of using the input value to select the particular substitute value or translation which is the result. Each of the possible substitutions in a single table may also be called a substitution element.

All ciphers must, at least in principle, confront an "enemy" or opponent who seeks the information contained in the ciphertext. Substitution is generally easy to solve or penetrate because the different letters in a written language are used with different characteristic frequencies, and substitution does not change those relationships. Accordingly, a cryptanalyst attempting to penetrate the cipher can often make good guesses for various letter substitutions. And, since language is naturally redundant, those guesses generally can be extended with other guesses until the message becomes fully known.

In a polyalphabetic substitution cipher, each letter has multiple fixed substitutes; that is, multiple substitution alphabets are used in some sequence. The different substitution alphabets help to obscure the letter-frequency statistics of the plaintext, but the fixed nature of the substitution alphabets, and their use in a fixed sequence, still allows fairly easy penetration, given a reasonable amount of ciphertext. Although small substitutions are still used, substitution has largely been abandoned as the central part of serious ciphers because it is so easily penetrated.

BACKGROUND—CURRENT PRIOR ART

The current state of the art of cryptography includes stream cipher systems. Stream ciphers operate on a stream, or sequence, of plaintext data, one element at a time, to produce a stream of ciphertext.

A stream cipher generally combines plaintext data with pseudo-random confusion data to produce ciphertext data. A combining function or combiner mechanism in some way mixes two data sources to produce a typically more complex result. That is, many stream ciphers are grossly just a pseudo-random sequence generator and a combiner (as one example of many, see U.S. Pat. No. 4,202,051 issued May 6, 1980 to G. Davida and D. Wells). The combining function generally used is a simple binary bit-by-bit addition mod 2, which is also known as the Boolean logic exclusive-OR function. One form of exclusive-OR is a two-input one-output logic function which is now commonly available as an integrated circuit electronic digital logic building-block. The same function is also available as a logical command on most general-purpose computers or microprocessors.

The exclusive-OR function has been used for stream-cipher data encryption for more than 70 years (the first known version, using electro-mechanical relay logic, can be seen in U.S. Pat. No. 1,310,719 issued July 22, 1919 to G. Vernam). Various embodiments of the exclusive-OR combiner function have been patented (for example, see the electronic vacuum tube version in U.S. Pat. No. 2,496,317 issue Feb. 7, 1950 to H. Smith; U.S. Pat. No. 2,567,214 issued Sept. 11, 1951 H. Kohler; and a mechanical version in U.S. Pat. No. 3,159,712 issued Dec. 1, 1964 to R. Arko). The exclusive-OR combiner is useful for encryption because it helps to disguise the frequency statistics of the plaintext data; if either input to the exclusive-OR combiner is a pseudo-random sequence, the result will generally have random characteristics. In the case of exclusive-OR combiners, the exact same mechanism used for combining the plaintext data into ciphertext can also be used to extract the plaintext data from the ciphertext. In contrast, the combining mechanism of this invention requires a different but related mechanism to extract the plaintext data.

On the surface, the use of the exclusive-OR function as a cryptographic combiner apparently reduces the ciphering problem to the design of a confusion generator or random number generator which would be exceedingly difficult for a cryptanalyst to fully analyze. Accordingly, we see the continuing development of ever more complex random number generators (for example, see the above mentioned U.S. Pat. No. 4,202,051 issued May 6, 1980 to G. Davida and D. Wells). But the exclusive-OR combiner itself has properties which actually aid in the cryptanalysis of the confusion stream. For example, if an analyst is able to obtain some amount of plaintext plus the matching ciphertext, the analyst can recover that portion of the raw confusion source. Normally we think of an analyst trying to decipher the encrypted data, but if the analyst can fully analyze and reproduce the pseudo-random source, all subsequent messages can be deciphered. Such analysis may even be possible under the assumption that some particular words will appear at particular places in a message, as typically occurs in standard message, memo, and business letter formats.

The obvious alternative of selecting some other simple Boolean logic function to replace the exclusive-OR combiner does not work. The other two-input Boolean logic functions (e.g., AND, OR) are not suitable; if these functions have a pseudo-random sequence on one input, the output is generally not random-like. More complex combining functions are the current state-of-the-art (for example, see U.S. Pat. No. 4,797,922 issued Jan. 10, 1989 to J. Massey and R. Rueppel). Note that Massey's device simply combines confusion streams, and so need not be reversible; in contrast, a combiner for data nd confusion would have to be reversible so that he enciphered data could be deciphered.

BACKGROUND—U.S. PAT. NO. 4,195,196

Another example of the prior art occurs in U.S. Pat. No. 4,195,196 reissued June 1, 1982 (Re. 30,957) to H. Feistel. This mechanism can be seen as a stream cipher system which is a product cipher or multiple-level cipher, each level consisting of an exclusive-OR combiner and a "confusion" stream. Multiple pseudo-random confusion streams are generated simultaneously by transformations of stored state and the plaintext and ciphertext data from each level; thus, this mechanism is an example of an autokey cipher, in which the confusion data is generated as a complex transformation of the key, initializing, and message data.

Each cipher level of the mechanism consists of an exclusive-OR combiner and a confusion sequence. However, due to the mathematical characteristics of the exclusive-OR operation, the ciphertext result will not sensibly differ from a single exclusive-OR combiner and single modified autokey confusion generator which itself holds several internal delayed combinations of message data. This is important, because it reveals that the mechanism may be vulnerable to the "known plaintext" attack discussed earlier.

If plaintext data are exclusive-OR combined with the associated ciphertext data, the result is a confusion sequence which can be directly related to a modified confusion generator. A cryptanalyst could use the regenerated confusion sequence and plaintext message data to attempt to define the internal state and key in the modified generator. If successful, this would penetrate the modified confusion generator, and also the equivalent cipher system using the un-modified confusion generator.

Thus we see that this mechanism is an example of a classical Vernam stream cipher: a pseudo-random confusion generator plus conventional exclusive-OR combining. It is thus susceptible to the plaintext attack, which is a weakness of all exclusive-OR combiners. A similar system, one using exactly the same confusion generator but with a combiner less susceptible to attack, would seem to be a significant improvement.

BACKGROUND—U.S. PAT. NO. 4,751,733

Yet another example of prior art occurs in U.S. Pat. No. 4,751,733 issued June 14, 1988 to B. Delayaye and A. Lebret. This is a substitution-permutation product cipher which applies a sequence of substitutions and permutations to the plaintext data, with each substitution selected by the key from a set of pre-defined tables.

In some sense the substitution tables are "changed" under different keys, since each key selects a particular group of active tables. However, the key does not change during ciphering, and so the ultimate transformation, from input to output, while complex, also does not change during ciphering, and this is a weakness. The preferred embodiment is a 32-bit transformation from input to output; in theory, if the mechanism were left unguarded, the complete 32-bit to 32-bit transformation could be investigated and recorded, and the system thus penetrated until the pre-defined substitution tables were eventually updated and changed.

Even if the key were "randomized" or otherwise "stepped" during operation (a possibility seeming not supported by the patent), the mechanism would still be restricted to selecting complete tables from a fixed set of unchanging substitution tables.

Because static pre-defined tables constitute the heart of this mechanism, it is essential that they be retained as secrets. Since the table contents do not change, they are amendable to cryptanalysis and eventual penetration. Consequently, the tables will need to be changed on some regular basis, thus initiating an industry in which the tables must be created, manufactured, stored, transported, and retained, all in absolute secrecy. It would seem that an improved combiner mechanism, one less susceptible to cryptanalysis and requiring less of a support industry, must necessarily yield a big improvement in this cipher system.

OBJECTS AND ADVANTAGES

One of the objects of this invention is to provide a mechanism or process by which plaintext or other data can be combined using confusion data to produce a complex intermediate form of ciphertext result. The mechanism of this invention thus provides the basis for a cryptographic system.

Another object of this invention is to provide a combining mechanism or process which can create a multitude of intermediate forms depending on the combination of plaintext and confusion values. This means that attempts to penetrate the ciphertext by trying every possible intermediate form are unlikely to succeed.

Yet another object of this invention is to provide a combining mechanism or process which is more difficult to cryptanalyze than a simple exclusive-OR combining function. This is a significant advantage, because such an analysis could penetrate the system for all future messages.

Another object of this invention is to provide a combining mechanism which will hide the confusion data when the cryptanalyst has both some amount of plaintext as well as the associated ciphertext. Since it is difficult to provide that any particular pseudo-random confusion generator will not ever be cryptanalyzed, hiding the confusion data and thus complicating such an analysis is a big advantage.

Still another object of this invention is to provide an efficient inverse mechanism or process by which previously-combined data can be separated or extracted, suing the confusion data involving in the original combination. Since deciphering is normally required, an efficient mechanism can make the whole system practical.

Another object of this invention is to provide a mechanism or process by which two confusion sources can be combined to produce a more-complex confusion result which may be used by some other combiner mechanism. Since the analysis of the confusion data could lead to penetration of a cipher system, the ability to create ever more complex confusion data is a big advantage.

And yet another object of this invention is to provide a form of substitution which tends to randomize the letter-frequency statistics of the plaintext data. Since the conventional statistical attacks on substitution utilize these statistics, those attacks would tend to be rendered ineffective.

And still another object of this invention it to provide an encryption module which can be used as part of a complex encryption system composed of a network of cryptographic modules, each potentially different. This would allow the encryption system to vary from message to message, or even dynamically within a message. Since the encryption system itself could change, it would be hard for a cryptanalyst to know how to start working on the other aspects of the system.

Further objects and advantages of my invention will become apparent from a consideration of the drawing and the ensuing description.

DESCRIPTION OF DRAWINGS

FIG. 1 shows a combining mechanism, for enciphering data, and also the required inverse or extracting mechanism, for deciphering the enciphered data.

LIST OF REFERENCE NUMERALS

10: combiner substitution input
12: combiner substitution
14: combiner output
16: combiner substitution changes input
18: combiner substitution changes controller
20: combiner substitution changes controls
22: extractor inverse substitution input
24: extractor inverse substitution
26: extractor output
28: extractor substitution changes input
30: extractor substitution
32: extractor substition output
34: extractor sibstituon changes controller
36: extractor sibstition changes controls
38: extractor inverse substitution changes controller
40: extractor inverse substitution changes controls

DESCRIPTION—FIG. 1

A typical embodiment of any cipher system would include both enciphering and deciphering; thus, FIG. 1 consists of a combiner or enciphering section and an extractor or deciphering section. As in other stream ciphers, it is assumed that identical pseudo-random sequences are available for enciphering and deciphering. FIG. 1 is the currently preferred embodiment, in which the substitution alphabets are changed under the control of two values. In this embodiment, the substitution elements selected by these values are exchanged. Other embodiments might require other or additional change-selection inputs, and might make more changes in the substitution block than a simple exchange of two elements.

FIG. 1 is a block diagram of the type commonly employed by those skilled in the art of electronic design. The FIGURE may be interpreted as a network of simultaneous independent functions which receive data, process it, then pass the data on to the next function. The same FIGURE may also be interpreted as a time sequence of different operations on a single block of data which is not moved. Presumably there are also other alternate interpretations. In truth, the particular design selected for a real system will depend on engineering trade-offs which are at the heart of the normal practice of the art of systems design.

In the combiner section, combiner substitution 12 translates combiner substitution input 10 data into combiner output 14 data. The result would be a simple substition, except that the substitution 12 will change. A substitution or inverse substitution would typically be implement as addressable storage, and realized with an electronic memory device, or an addressable area of memory hardware in an electronic digital computer or microprocessor.

The substitution changes controller 18 uses both substitution input 10 and combiner substitution changes input 16 to change the contents of substitution 12 by way of combiner substitution changes controls 20. Typically, substitution input 10 and changes input 16 each select an address or substitution element in substitution 12; the selected substitution elements are then exchanged.

The particular type of changes controller required in a particular design would typically be implemented in electronic logic by someone skilled in the art of digital electronic design. Alternately, the changes could be implemented as a sequence of instructions to an electronic digital computer or microprocessor to change the values in the substition area of memory hardware. Since, in this preferred embodiment, the controller always exchanges exactly two elements stored in a memory device, this would be a fairly basis and straightforward design.

The combiner output 14 is connected to the extractor input 22 so that deciphering may occur. This connection represents data transmission and/or storage.

In the extractor section, extractor inverse substitution 24 translates extractor inverse substitution input 22 data into extractor output 26 data. This would also be a simple substitution, except that this substitution is also changed; the resulting data out 26 is the same as the combiner data in 10. The extractor substitution 30 translates the extractor substitution changes input 28 data into the extractor substitution output 32 data; extractor substitution 30 is the same as combiner substitution 12, and is used to develop translated pseudo-random data to change inverse substitution 24.

The extractor changes controller 34 uses both the extractor output 26 and the extractor substitution changes input 28 to change the contents of the substitution 30 by way of extractor substitution changes controls 36. In this way, substitution 30 in the extractor is kept up with the identical substitution 12 in the combiner. This occurs because the correctly-deciphering Data Out value (on output 26) is the same as the Data In value (on input 10) which was enciphered; the same pseudo-random sequence is also used by both units, so whatever changes occur in combiner substitution 12 can be made to occur identically in extractor substitution 30.

The extractor inverse changes controller 38 sues both extractor input 22 and extractor substitution output 32 to change the contents of inverse substitution 24 by way of the extractor substitution changes controls 40. Since plaintext data and pseudo-random data are used to change substitution 12, substituted plaintext data nd substituted pseudo-random data are appropriate to change inverse substitution 24. In this way, the deciphering inverse substitution 24 keeps up with the changing enciphering substitution 12.

OPERATION

A plaintext value on input 10 is transformed by substitution 12 into a ciphertext value on output 14. A ciphertext value on input 22 is transformed by substitution 24 into the original plaintext value on output 26. In order for this to work, substitution 12 must be invertible.

Substitution 12 will be invertible if it contains no more than one instance of any particular output value. In practice this is easy to guarantee. For example, the substitution table can be made exactly as large as the number of possible input values 10, and filled sequentially with the possible output values. If no output value appears more than once, substitution 12 will be invertible. Substitution 12 can then be shuffled or randomized in any number of ways; as long as the values in the table are simply re-arranged or permuted, substitution 12 will remain invertible.

After substituting, some of the substitution elements in substitution 12 will be rearranged. In order to decipher subsequent data, inverse substitution 24 must also be rearranged, but in an inverse manner. To make this easier, an extractor can maintain its own substitution 30 which tracks substitution 12 in the combiner.

In the preferred embodiment, controller 18 exchanges two substitution elements; these elements are selected by the plaintext value 10 and the pseudo-random value 16. These same values will also be available to controller 34 in the extractor, to change substitution 30 in exactly the same way. The plaintext input 10 is available because it was enciphered and then deciphered as the extractor output 26. The changes inputs, on the combiner 16 and the extractor 28, must be exactly the same pseudo-random sequence. This is a normal requirement for stream cipher, and also a requirement of the combining mechanism of this invention.

But before substitution 30 is changed, it is used to translate the pseudo-random value on input 28 into a value on output 32, which selects one of the elements which must be changed in substitution 24. The other element which must be changed is selected by the ciphertext value on the extractor input 22. These values are the enciphered or translated versions of the Data In (on input 10) and Pseudo-Random In (on input 16) values which are used to change substitutions 12 and 30. The translated values select the correct elements to be exchanged, because the entire inverse substitution 24 is simply a translation of the combiner substitution 22. Controller 38 exchanges the two elements in the inverse substitution 24 as selected by the translated values.

DYNAMIC SUBSTITUTION AND PSEUDO-RANDOM RESULTS

It is interesting, important, and unexpected, that if either combiner input has random characteristics, the output will also have random characteristics, as long as the input streams are not correlated. There are two cases:

Case 1: First, we assume a random input 10, a constant input 16, and that the substitution elements in 12 are evenly distributed. We note that the substitution elements in 12 will be evenly distributed if the overall substitution 12 is invertible, and it generally will be invertible to support deciphering. When the substitution elements are evenly distributed, any input distribution must produce a similar result distribution, so a random input 10 will produce a random output 14.

Case 2: Next, we assume a random input 16, and a constant input 10. The value on input 10 will select a particular substitution element in 12 to be sent to output 14. But each time this occurs, the value of that particular element will be exchanged with the value of some element selected by input 16, which is random. Consequently, the value of the particular element selected by constant value 10 changes at random after each substitution, so the output value 14 is random, despite a constant input 10.

Naturally, if the sequences on input 10 and input 16 were similar or correlated, the combiner could be made to produce non-random output (an exclusive-OR combiner could be defeated similarly). But this is normally made very unlikely by cryptographic design.

Thus, a random sequence on either input of the combiner of this invention will generally produce a random sequence out. This is similar to the statistical characteristics of the exclusive-OR combiner. These unexpected and advantageous results seem to make this invention statistically comparable to the conventional exclusive-OR combiner. But this invention does not have the cryptanalytic weakness of the exclusive-OR combiner, and thus would seem to be superior overall.

DYNAMIC SUBSTITUTION IN GENERAL

Plaintext data values are processed sequentially, typically character-by-character. Each plaintext character value selects an element in a substitution table, and that element becomes the ciphertext value. After each substitution, the values in the substitution table may be changed or re-organized. In the preferred embodiment, the just-used substitution value is exchanged with some value in the table selected by another data sequence; commonly, this other sequence will be pseudo-random.

If the substitution table is invertible, any particular ciphertext value may be translated back into plaintext with s suitable inverse substitution table. However, when the forward substitution table changes, the inverse substitution table must also change. In the preferred embodiment, the change in the forward table is a simple exchange of two elements; thus, two elements must also be exchanged in the inverse table. Both of the elements to change in the inverse table are the enciphered values of the elements exchanged in the forward table. One of the elements is the enciphered plaintext value, which is the ciphertext value, and is directly available. The other element is the enciphered pseudo-random value, and this is not directly available.

In order to identify the second element to be exchanged in the inverse table, it is reasonable to maintain a forward substitution table. This table can be maintained directly, since both the plaintext value (as deciphered) and the pseudo-random value (reproduced locally) are available. Given a forward substitution table, the pseudo-random value can be enciphered to identify the second element to be exchanged in the inverse table.

A polyalphabetic version, with multiple invertible tables in each case, is likely to be even more secure, at the expense of some extra storage and a wider-range pseudo-random sequence.

OTHER EMBODIMENTS

The discussion of FIG. 1 described a particular currently-preferred embodiment of this invention, but many other embodiments are possible. For example, many different control circuits could be designed by a practitioner skilled in the art of electronic digital design, and each of the designs might still perform the same functions needed in this invention.

As examples of other possible embodiments, any desired amount of substitution element permutation could occur, after each translation, or perhaps after several or a variable number of translations. A wider range of data values could be accommodated by expanding data paths and storage cells in the substitution memories. Moreover, various designs could choose to do the various operations in different sequences, or in parallel. It is well within the responsibilities of an implementor skilled in the art of electronic design to select the sequences in which functions will be performed, and even those functions which can be performed in parallel.

FIG. 1 and the description deal with particular functional blocks, but the same processes could be implemented with different blocks. The functional decomposition of a concept into separate modules or blocks for a particular design in a standard task for a skilled practitioner of any system design technology. The design variations of this invention are essentially endless.

MULTIPLE REALIZATIONS

Virtually any logical computation technology could be used to realize this invention. Such technologies might include electronics, microelectronics, mechanics, light, fluidics, chemical or biological system, etc. The invention could be realized as a sequence of instructions executed by a general purpose computer or microprocessor; it could be realized as software or microcode or as part of a custom microprocessor or integrated circuit device. Various hardware or software realizations could do the individual operations in different sequences, or in parallel, or combine hardware and software operations. Moreover, a complex system might include this invention as but a small part of its overall operations.

RAMIFICATIONS

The discussion of FIG. 1 described a particularly practical use of the combiner. This use was as a cryptographic system, which combined plaintext data and an external pseudo-random sequence into ciphertext data. The original plaintext data could then be recovered by extracting the ciphertext data with the same pseudo-random sequence. Presumably, the pseudo-random sequence used for combining would be initialized by some sort of key value, and the exact same sequence could be developed for extraction only by using the exact same key.

Another use for dynamic substitution combiner would be to combine two different pseudo-random sources. This would generate a more-complex pseudo-random combination, and would also help protect both input sources from analysis better than the simple exclusive-OR combiner generally used. In this case, an extractor would generally be unnecessary, since the same combined result could be reproduced by generating the original pseudo-random sources and combining them.

Yet another application for the mechanisms of this invention would be as modules or building-blocks of a large complex ciphering system with multiple different module designs. Each module could produce key-controlled results. Variously-constructed data could flow from module to module to generate an eventual result.

The arrangement of ciphering modules might be fixed by design, or selected by the key, or might even change dynamically as a result of a pseudo-random sequence, or even cipher-network values.

Because the combiner can generate more-random data, or selectively randomized data, it might well have application in data transmission and data modulation (e.g., modems), radar, sonar, data storage, data conversion, facsimile, graphics, numerical statistics, simulation, artificial life, and artificial intelligence; indeed, any field which benefits from the use of pseudo-random sequences.

SUMMARY

Thus the reader will see that the combiner herein described can generate a continually-changing yet reversible combination of two data sources which is an improvement over the simple exclusive-OR combiner used in most stream ciphers.

The method of the present development is to revive and generalize the venerable substitution cipher, with the addition of a new data input which is used, along with the substitution input, to alter the contents of the translation table during operation.

The new data input, generally used for a confusion source, turns the ancient substitution operation into a combining function, with many new possibilities for interconnection and use.

Analysis of this structure and experimental implementations have shown that it can obscure the normal usage-frequency statistics. Whenever a data value is substituted, that particular substitution becomes known, at least potentially, to an external cryptanalyst. But, as soon as that substitution is used, it is changed, and the cryptanalyst has no way to know what is has been changed to.

The same mechanism can function with either data or confusion values on either input, depending on the goals of the designer. Two confusion sources might be combined to make a more complex result, and even two data sources might be combined for some reason.

If the combiner substitution is made invertible (that is, containing no duplicated values), it may be changed by re-ordering (permutation) in any way and still remain invertible. Thus, an inverse substitution can be used to decipher data enciphering by the combiner, and can keep up with the changing substitution by changing in an inverse way.

But if the combiner result need not be deciphered, as in the case of combining two confusion sources into a more-complex result, then no inverse substitution is necessary.

An efficient polyalphabetic version of the invertible container is possible using multiple substitution blocks.

This invention improves upon the security of a classical substitution cipher by essentially using a different substitution alphabet for every data value enciphered.

CONCLUSION AND SCOPE OF INVENTION

This invention extends cryptographic substitution by allowing the substitution tables to change dynamically. It is important and also unexpected that this mechanism generally prevents plaintext letter frequency information from appearing in the ciphertext. Since letter frequency information is generally sufficient to break a substitution cipher, this is a big advantage.

This invention extends cryptographic substitution by teaching a substitution mechanism to translate plaintext data into a multitude of different ciphertext intermediate forms, based on a second data sequence. This sequence would typically be pseudo-random and initialized by some sort of key value. In this way, a multitude of different keys can be supported, so that the attack of trying every possible key can be made unreasonable.

This invention extends cryptographic substitution by adding a new input to control substitution changes. It is important that the added input converts a one-input substitution mechanism into a two-input combining mechanism with many more possibilities for interconnection and use.

This invention extends cryptographic combining by teaching a new combiner mechanism with statistical effects comparable to those of the conventional exclusive-OR combiner. Thus the new mechanism would seem to fit easily into current cryptographic system designs.

This invention extends cryptographic combining by teaching a new combiner mechanism to complicate penetration to the pseudo-random sequence in the event that a cryptanalyst has both ciphertext and the corresponding plaintext. This is important because it is very difficult to design a pseudo-random sequence generator which cannot be penetrated and past experience would lead us to mistrust any such claim. And if the pseudo-random sequence is penetrated, the cipher is broken.

This invention extends cryptographic substitution by teaching a mechanism to extract plaintext from the ciphertext produced by a combiner of this invention. It is important and unexpected that it is useful for the extractor to maintain a forward substitution identical with that used in the combiner, in order to efficiently maintain an inverse substitution.

While my above descriptions contain many specificities, these should not be construed as limitations to the scope of the invention, but rather as an exemplification of a preferred embodiment thereof. Many other variations are possible. Accordingly, the scope of the invention should be determined not by the embodiments illustrated, but by the appended claims and their legal equivalents.

I claim as my invention:

1. A mechanism for combining a first data source and a second data source into result data, including:
   (a) substitution means for translating values from said first data source into said result data or substitute values, and
   (b) change means, at least responsive to some aspect of said second data source, for permuting or re-arranging a plurality of the translations or substitute values within said substitution means, potentially after every substitution operation.

2. The combining mechanism of claim 1 wherein said substitution means is initialized to contain at most one occurrence of any particular translation.

3. The combining mechanism of claim 1 wherein the translations in said substitution means are held in a plurality of translation tables or lists.

4. The combining mechanism of claim 3 wherein each translations table in said substitution means is initialized to contain at most one occurrence of any particular translation.

5. The combining mechanism of claim 3 wherein some aspect of said second data source is used to select a particular translation table to be used for substitution and permutation.

6. The combining mechanism of claim 3 wherein every just-used translation in a translation table is exchanged with some translation in the same table.

7. The combining mechanism of claim 1 wherein those translations in said substitution means which are permuted by said change means include each translation which has been selected by said first data source subsequent to a previous permutation of that translation.

8. The combining mechanism of claim 1 wherein every just-used translation in said substitution means is exchanged with some translation in said substitution means.

9. A mechanism for extracting original data from a first data source using a second data source, including:
   (a) first substitution means for inverse translating values from said first data source into said original data or resulting data values,
   (b) second substitution means for translating values from said second data source into translated second data source values,
   (c) second change means, at least responsive to some aspect of said resulting data values, for permuting or re-arranging a plurality of the translations within said second substitution means, and
   (d) first change means, at least responsive to some aspect of said translated second data values, for permuting or re-arranging a plurality of the translations within said first substitution means.

10. The extracting mechanism of claim 9 wherein the translations in said first substitution means and said second substitution means are held in a plurality of translation tables.

11. The extracting mechanism of claim 10 wherein some aspect of said second data source is used to select the translation tables used for substitution and 12. The extracting mechanism of claim 10 wherein every just-used translation in a table is exchanged with some translation in the same table.

13. The extracting mechanism of claim 9 wherein said resulting data and said second data source are used to select two elements in said second substitution means, and said second change means acts to exchange the values of the selected elements.

14. The extracting mechanism of claim 9 wherein said first data source and said translated second data source are used to select two elements in said first substitution means, and said first change means acts to exchange the values of the selected elements.

15. A two-input one-circuit logic mechanism or design, which combines a first input value with a second input value, including:
   (a) substitution means, potentially including a plurality of storage means, for saving substitute values and translating said first input value into an output value, and
   (b) change means, at least responsive to some aspect of said second input value, for redefining a plurality and proper subset of the substitute values within said storage means, potentially after every substitution operation.

16. The logic mechanism of claim 15 wherein each storage means in said substitution means is initialized to contain at most one occurrence of each substitute value.

17. The logic mechanism of claim 15 wherein said change means alters substitute values in said substitution means only by permutation or re-arrangement within individual storage means.

18. The logic mechanism of claim 15 wherein said change means alters substitute values in said substitution mans by the exchange of substitute values.

19. The logic mechanism of claim 15, further including:
 (c) another instance of the logic mechanism of claim 15,
wherein the two instances of the mechanism together extract a result data value from a first data value using a second data value, by placing said first data value on said first input value input of the first mechanism, and using said output value from the first mechanism as said result data value, and connecting said result data value to said second input value input of the second mechanism, and placing said second data value on said first input value input of the second mechanism, and connecting said output value of the second mechanism to said second input value of the first mechanism.

* * * * *

UNITED STATES PATENT AND TRADEMARK OFFICE
CERTIFICATE OF CORRECTION

PATENT NO. : 4,979,832

DATED : Dec. 25, 1990

INVENTOR(S) : Terry F. Ritter

It is certified that error appears in the above-identified patent and that said Letters Patent is hereby corrected as shown below:

Col. 1, line 9, change "combination" to —combining—.

Col. 1, line 14, change "patient" to —patent—.

Col. 10, line 54, change "container" to —combiner—.

Claim 4, col. 11, line 62, change "translations" to —translation—.

Claim 11, col. 12, line 35, after "and" insert —permutation.—.

Claim 15, col. 12, line 49, change "circuit" to —output—.

Claim 18, col. 13, line 3, change "mans" to —means—.

Signed and Sealed this

Twenty-first Day of April, 1992

Attest:

HARRY F. MANBECK, JR.

*Attesting Officer*  *Commissioner of Patents and Trademarks*